CONTROL OF IMPEDANCE OF SEMICONDUCTOR AMPLIFIER CIRCUITS

Original Filed Nov. 6, 1948 6 Sheets-Sheet 1

$$\text{INPUT } Z = Z_e + \frac{Z_b(Z_c + Z_2 - Z_m)}{Z_b + Z_c + Z_2}$$

$$\text{OUTPUT } Z = Z_c + \frac{Z_b(Z_e + Z_1 - Z_m)}{Z_b + Z_e + Z_1}$$

INVENTOR
H. L. BARNEY
BY Harry C. Hoxt
ATTORNEY

CONTROL OF IMPEDANCE OF SEMICONDUCTOR AMPLIFIER CIRCUITS
Original Filed Nov. 6, 1948 6 Sheets-Sheet 2
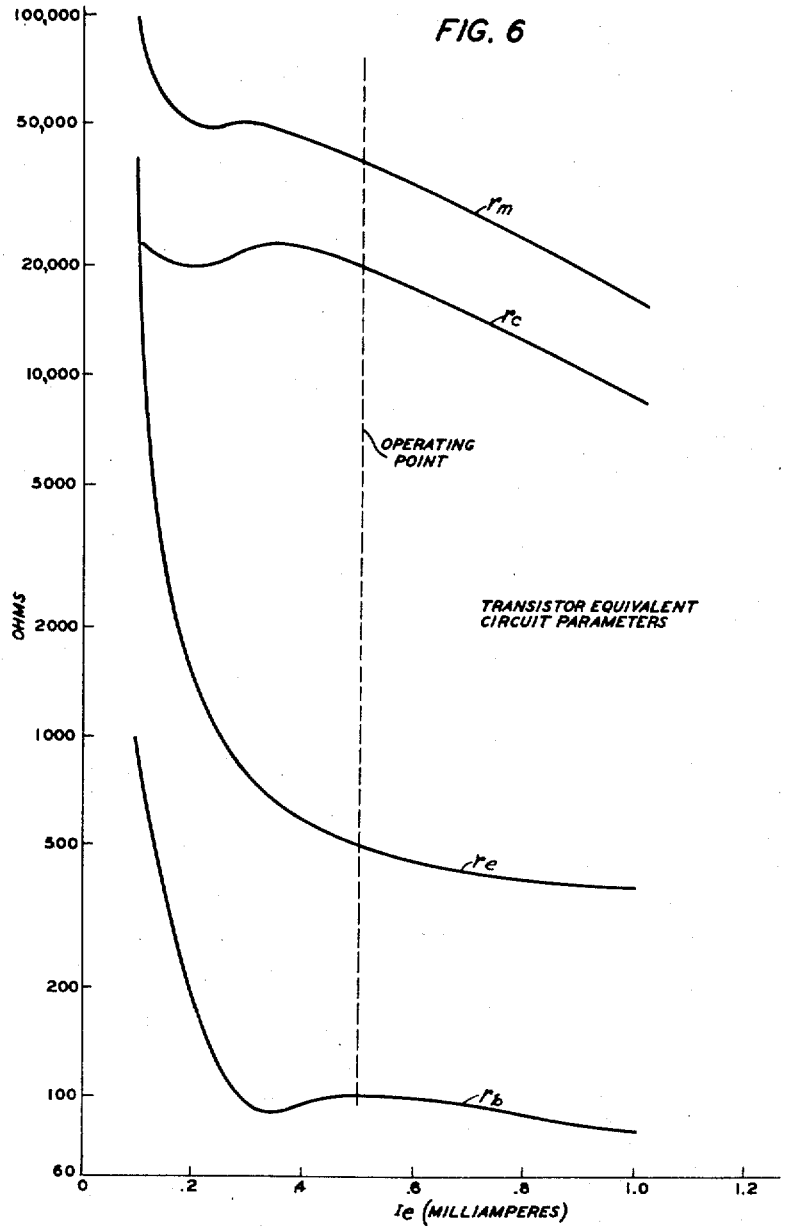
INVENTOR
H. L. BARNEY
BY Harry C Hart
ATTORNEY

CONTROL OF IMPEDANCE OF SEMICONDUCTOR AMPLIFIER CIRCUITS

Original Filed Nov. 6, 1948 6 Sheets-Sheet 3

$$\text{INPUT } Z = Z_b + \frac{Z_e(Z_c + Z_2)}{Z_e + Z_c + Z_2 - Z_m}$$

$$\text{OUTPUT } Z = Z_c + \frac{(Z_e - Z_m)(Z_1 + Z_b)}{Z_1 + Z_b + Z_e}$$

INVENTOR
H. L. BARNEY
BY Harry C. Hart
ATTORNEY

CONTROL OF IMPEDANCE OF SEMICONDUCTOR AMPLIFIER CIRCUITS

Original Filed Nov. 6, 1948 6 Sheets-Sheet 4

$$\text{INPUT } Z = Z_b + \frac{Z_c(Z_e+Z_2)}{Z_e+Z_c+Z_2-Z_m}$$

$$\text{OUTPUT } Z = Z_e + \frac{(Z_1+Z_b)(Z_c-Z_m)}{Z_c+Z_b+Z_1}$$

INVENTOR
H. L. BARNEY
BY Harry C. Hart
ATTORNEY

CONTROL OF IMPEDANCE OF SEMICONDUCTOR AMPLIFIER CIRCUITS

Original Filed Nov. 6, 1948 6 Sheets-Sheet 5

$$R_{in} = r_b + \frac{(r_c+R_p)(r_e+R_2)}{r_e+r_c+R_p+R_2-r_m}$$

$$R_{out} = r_e + \frac{(R_1+r_b)(R_p+r_c-r_m)}{r_b+r_c+R_1+R_p}$$

INVENTOR
H. L. BARNEY
BY Harry C. Hart
ATTORNEY

CONTROL OF IMPEDANCE OF SEMICONDUCTOR AMPLIFIER CIRCUITS

Original Filed Nov. 6, 1948 6 Sheets-Sheet 6

INVENTOR
H. L. BARNEY
BY Harry C. Hart
ATTORNEY

Reissued Oct. 14, 1952

Re. 23,563

UNITED STATES PATENT OFFICE 23,563

CONTROL OF IMPEDANCE OF SEMICONDUCTOR AMPLIFIER CIRCUITS

Harold L. Barney, Madison, N. J., assignor to Bell Telephone Laboratories, Incorporated, New York, N. Y., a corporation of New York Original No. 2,585,077, dated February 12, 1952, Serial No. 58,684, November 6, 1948. Application for reissue July 3, 1952, Serial No. 297,198

5 Claims. (Cl. 179—171)

Matter enclosed in heavy brackets [ ] appears in the original patent but forms no part of this reissue specification; matter printed in italics indicates the additions made by reissue.

This invention relates to signal translation networks utilizing semiconductor amplifiers as active elements.

The principal object of the invention is to adjust the impedance of such a network, viewed at its input terminals or its output terminals, to a desired value.

More particular objects are: to match the input impedance of such a network to that of a specified source; to match the output impedance of such a network to that of the specified load; to make the input impedance of such a network substantially infinite; to make the input or output impedance of such a network substantially zero; to make the input and output impedances of such a network substantially alike in magnitude.

Related objects are to minimize or eliminate interstage coupling devices from translating apparatus of a plurality of stages, each of which comprises a semiconductor amplifier network, and to match the impedance of such apparatus as a whole to that of a specified source and its output impedance to that of a specified load.

Application Serial No. 11,165 of John Bardeen and W. H. Brattain, filed February 26, 1948 (and after the filing on June 17, 1948, by the same inventors of a continuation-in-part application, Serial No. 33,466, now Patent No. 2,524,035, issued October 3, 1950, allowed to become abandoned) describes and claims an amplifier unit of novel construction comprising a small block of semiconductor material, such as N-type germanium, with which are associated three electrodes. One of these, known as the base electrode, makes low resistance contact with a face of the block. It may be a plated metal film. The others, termed emitter and collector, respectively, preferably make rectifier contact with the block. They may, in fact, be point contacts. The emitter is biased to conduct in the forward direction and the collector is biased to conduct in the reverse direction. "Forward" and "reverse" are here used in the sense in which they are understood in the rectifier art. When a signal source is connected between the emitter and the base and a load is connected in the collector circuit, it is found that an amplified replica of the voltage of the signal source appears across the load. The aforementioned application contains detailed specifications for the fabrication of the device.

The device may take various forms, all of which have properties which are generally similar although they differ in important secondary respects. Examples of such other forms are described and claimed in an application of J. N. Shive, Serial No. 44,241, filed August 14, 1948, and an application of W. E. Kock and R. L. Wallace, Jr., Serial No. 45,023, filed August 19, 1948, and issued July 17, 1951, as Patent 2,560,579. The device in all of its forms has received the appellation transistor, and will be so designated in the present specification.

In the original Bardeen-Brattain application above referred to, there appears a tabulation of the performance characteristics of three sample transistors. In one of these, it appears that increments of signal current which flow in the circuit of the collector electrode as a result of the signal current increments which flow in the circuit of the emitter electrode exceed the latter in magnitude. This feature of transistors has become the general rule, and appears in nearly all transistors fabricated. It is discussed in detail in the aforementioned continuation-in-part application of John Bardeen and W. H. Brattain, Serial No. 33,466, filed June 17, 1948, issued October 3, 1950 as Patent 2,524,035. It is of such importance in connection with the present invention, as well as otherwise, that the ratio of these increments has been given a name, "$\alpha$." In one of its aspects, although not exclusively, the present invention deals with transistors in which $\alpha>1$ ($\alpha$ exceeds unit) and is based on the discovery that with a network of which such a device is the active element, the impedance looking into its input or output terminals can, by appropriate proportioning of one of the network parameters in relation to the transistor parameters, be made to take on values which vary over a much wider range than is possible with the most nearly analogous vacuum tube networks. It will be explained below, in the detailed description of the invention which follows, how it is that the value of a resistor included in the one circuit modifies the impedance of the other circuit.

The invention will be fully apprehended from the following detailed description of certain preferred embodiments thereof, taken in connection with the appended drawings, in which:

Fig. 6 is a group of graphs showing transistor parameter values as functions of emitter bias current;

Figure 1:
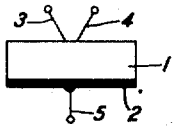
Fig. 1 is a schematic diagram of a transistor.
Figure 2:
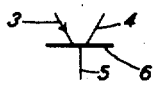
Fig. 2 is a symbolic representation of a transistor as employed in the present specification.

In Fig. 1 there is shown a diagrammatic representation of a transistor comprising a block 1 of semiconductor material, having a plated film 2 of metal making low resistance contact with one face, an emitter electrode 3 and a collector electrode 4, making contact close together on the opposite face. A base electrode 5 is connected to the film 2. To simplify the drawings, a symbolic representation, shown in Fig. 2, is used henceforth. In this figure, the emitter 3 is distinguished by an arrowhead which points inward for N-type material, the collector 4 by making contact on the same face of the block as the emitter, and the base electrode 5 by making contact on the opposite face. The short heavy line 6 represents the block itself.

Figure 3:
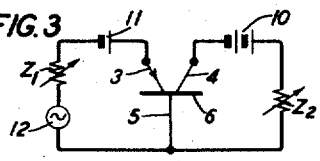
Fig. 3 is a schematic circuit diagram of a transistor amplifier network of the grounded base type.

Fig. 3 is a schematic circuit diagram of a transistor amplifier network in which the transistor itself is represented by the symbol of Fig. 2. A bias source 10 of perhaps 40 volts is connected to apply negative bias potential to the collector 4, while another source 11, usually of a fraction of a volt, is connected to apply a small positive bias potential to the emitter 3 (or a small negative bias potential to the base electrode 5, depending upon one's point of view). A load represented by an impedance $Z_2$, which may be variable, is connected in the collector circuit. A signal source 12 is connected in the input circuit, i. e., between the emitter 3 and the base 5. In addition, an external or "source" impedance $Z_1$ is connected in the input circuit. This impedance evidently reduces the signal voltage applied to the input terminals of the transistor, for a given source voltage, but it serves an important purpose as will more fully appear below.

As is now well known, the voltage which appears across the load impedance $Z_2$ contains a component which is an amplified replica of the source voltage. In addition, it is found that in the great majority of transistors, $\alpha$ is so great that the signal frequency component of the collector current exceeds the signal frequency component of the emitter current even when the network load impedance $Z_2$ is of substantial magnitude.

The collector signal current $i_c$, corresponding to a given emitter signal current $i_e$, depends on the collector voltage and on the circuit configuration. Therefore $\alpha$ cannot be exactly specified without specifying these matters. A sufficiently exact definition of $\alpha$ is therefore $$\alpha=\left(\frac{i_c}{i_e}\right)_{V_c=\text{const., grounded base connection}} \qquad (1)$$

or, $\alpha$ is equal to the ratio of collector signal current to emitter signal current when the base electrode 5 is common to the input and output circuits and when the collector voltage is held constant. In a network of this configuration in which a constant potential source supplies operating bias to the collector and in which signal frequency collector currents flow through a load impedance $Z_2$ and cause signal frequency changes in the collector voltage, an equivalent definition of $\alpha$, namely, $$\alpha=\lim_{Z_2\to 0}\left(\frac{i_c}{i_e}\right) \qquad (2)$$

is more convenient to use.

It is convenient to analyze the performance of transistors for small signal inputs by means of equivalent circuits from which all but the essentials have been eliminated. It has been found that the equivalent circuit which best serves the purpose is a Y or T section of three passive legs which represent the base impedance, the emitter impedance and the collector impedance, respectively, and, in series with the collector leg, a fictitious generator 13 whose electromotive force is proportional to the emitter current. Thus $$e'=Z_m i_e \qquad (3)$$

Figure 4:
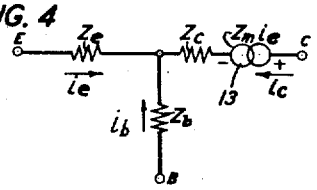
Fig. 4 is the equivalent circuit of a transistor.

Such an equivalent circuit is shown in Fig. 4. These elements of the equivalent circuit are identified herein as emitter, collector and base impedances, but it is to be understood that an actual impedance measurement between two electrodes of the transistor would not necessarily give the simple sum of the respective two impedances. The values of the equivalent circuit elements may be arrived at from such external impedance measurements as follows:

$$Z_e = Z_{11} - Z_{12}$$
$$Z_b = Z_{12}$$
$$Z_c = Z_{22} - Z_{12}$$
$$Z_m = Z_{21} - Z_{12}$$

where $Z_{11}$ is the impedance measured between the emitter and the base with the collector circuit effectively open;

$Z_{22}$ is the impedance measured between the collector and the base with the emitter circuit effectively open;

$Z_{12}$ is the ratio of the signal voltage appearing between the emitter and the base, to the signal current flowing in the collector circuit, when the emitter circuit is effectively open;

$Z_{21}$ is the ratio of the signal voltage appearing between the collector and the base, to the signal current flowing in the emitter circuit when the collector circuit is effectively open.

The assumed directions of current flow and the polarity of the electromotive force of the internal generator 13 are as shown in Fig. 4 for the above measurements.

Figure 5:
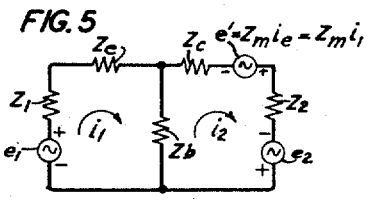
Fig. 5 is the equivalent circuit of the transistor network of Fig. 3.

Fig. 5 is an equivalent circuit corresponding to the transistor amplifier network of Fig. 3, which is of the "grounded base" type; i. e., the base impedance $Z_b$ is common to both meshes, while the emitter impedance $Z_e$ and the collector impedance $Z_c$ are individual to the first and second meshes, which are identified by mesh currents $i_1$ and $i_2$ in the customary manner. Test voltage sources $e_1$ and $e_2$ are connected in the first and second meshes for purposes of analysis.

As with Fig. 4, there appears in series with the collector impedance a source of electromotive force $$e' = Z_m i_e \tag{3}$$

As above stated, the fictitious electromotive force e' which is characteristic of the transistor is found to be substantially proportional to the emitter current $i_e$. The constant of proportionality thus has the dimensions of impedance, is termed a "mutual" impedance, and is designated $Z_m$.

It is of interest to determine the relation which must hold in order that $$\alpha = \lim_{Z_2 \to 0} \left(\frac{i_2}{i_e}\right) > 1 \tag{4}$$

The mesh equations of Fig. 5 are $$e_1 = (Z_1 + Z_e + Z_b) i_1 - Z_b i_2 \tag{5}$$
$$e_2 + Z_m i_1 = -Z_b i_1 + (Z_b + Z_c + Z_2) i_2 \tag{6}$$

The foregoing definition (2) of $\alpha$ requires that it be determined when the output terminals of the transistor network are short-circuited for signal frequency currents. Furthermore, for the present purposes, the source can be treated as having no internal resistance. Thus, putting $$Z_2 = 0$$
$$e_2 = 0 \tag{7}$$
$$Z_1 = 0$$

and solving the Equations 5 and 6 simultaneously for $i_1$ and $i_2$ gives $$i_1 = e_1 \frac{Z_b + Z_e}{\Delta} \tag{8}$$

$$i_2 = e_1 \frac{Z_b + Z_m}{\Delta} \tag{9}$$

where $\Delta$ is the determinant of the coefficients of Equations 5 and 6, but in Fig. 5, $$i_c = i_2$$
$$i_e = i_1$$

and therefore $$\alpha = \frac{i_c}{i_e} = \frac{i_2}{i_1} = \frac{Z_m + Z_b}{Z_e + Z_b} \tag{10}$$

Tests of a large number of sample transistors have shown that the various impedances of the equivalent circuit are essentially pure resistances except at very high frequencies and that, within this resistive range, representative values are:

$Z_e$=200–800 ohms
$Z_b$=100–600 ohms
$Z_c$=15,000–30,000 ohms
$Z_m$=10,000–50,000 ohms Thus both $Z_m$ and $Z_c$ are many times as great as $Z_b$; so that, from Equation 10, to a good approximation, $$\alpha \doteq \frac{Z_m}{Z_e} \tag{11}$$

Though the expressions developed hereinafter for input and output impedances are general, the results which follow will be illustrated with examples involving resistive terminations, and for that part of the frequency scale in which the transistor equivalent circuit parameters are resistive. These parameters, when used in this connection, will be referred to as $r_e$, $r_b$, $r_c$ and $r_m$ instead of $Z_e$, $Z_b$, $Z_c$ and $Z_m$, respectively.

Out of the wide range of possible characteristics available among transistors, the results will be illustrated with three different sets of equivalent circuit parameters. The first, which will arbitrarily be referred to as type 1, satisfies the following conditions $$\alpha < 1$$

and $$r_m < r_e + r_c + \frac{r_c r_e}{r_b}$$

To illustrate this type, the following equivalent circuit parameter values are assumed:

$r_e$=500 ohms
$r_b$=100 ohms
$r_c$=20,000 ohms
$r_m$=10,000 ohms

Type 2 characteristics are obtained when the following conditions are met:

$$\alpha > 1$$

and $$r_m < r_e + r_c + \frac{r_c r_e}{r_b}$$

Values of equivalent circuit parameters assumed to illustrate this type are:

$r_e$=500 ohms
$r_b$=100 ohms
$r_c$=20,000 ohms
$r_m$=40,000 ohms

Type 3 characteristics are obtained when $$\alpha>1$$

and $$r_m>r_e+r_c+\frac{r_e r_c}{r_b}$$

To illustrate this type, the following values are assumed:

$r_e$=500 ohms
$r_b$=600 ohms
$r_c$=20,000 ohms
$r_m$=40,000 ohms

It is to be understood that while all transistors may be classified according to which of the three foregoing types they conform to, their values of the circuit parameters may vary widely from the particular combinations assumed above. Indeed, the parameters for any one transistor vary with operating conditions, as is illustrated on Fig. 6, which shows typical characteristics of $r_e$, $r_b$, $r_c$ and $r_m$ plotted against emitter bias current; i. e., steady current flowing to the emitter electrode ($I_e$). At the operating point of 0.5 milliampere emitter current, it will be seen that $r_e$=500 ohms
$r_b$=100 ohms
$r_c$=20,000 ohms
$r_m$=40,000 ohms which are the values earlier assumed to illustrate the type 2 transistor characteristics. Characteristics for transistors of type 1 and type 3 are similar in their general trends, though particular values of the parameters are numerically different.

Proceeding now to the investigation of the input impedance of the equivalent circuit of Fig. 5, and therefore of the transistor network Fig. 3, put $Z_1=0$ and $e_2=0$ in the foregoing equations 5 and 6 and solve for $i_1$. The result is $$i_1=\frac{Z_b+Z_e+Z_2}{\Delta}e_1 \qquad (12)$$

where $$\Delta=\begin{vmatrix} Z_e+Z_b & -Z_b \\ -(Z_b+Z_m) & Z_b+Z_e+Z_2 \end{vmatrix} \qquad (13)$$

or $$Z_{in}=\frac{e_1}{i_1}=\frac{\Delta}{Z_b+Z_e+Z_2}=Z_e+\frac{Z_b(Z_e+Z_2-Z_m)}{Z_b+Z_e+Z_2} \qquad (14)$$

By an exactly similar process, putting $$Z_2=0$$
$$e_1=0$$

but allowing $Z_1$ and $e_2$ to remain finite, it turns out that $$Z_{out}=\frac{e_2}{i_2}=Z_e+\frac{Z_b(Z_e+Z_1-Z_m)}{Z_b+Z_e+Z_1} \qquad (15)$$

These more general Equations 14 and 15 may be replaced by the following equations for illustrative purposes:

$$R_{in}=r_e+\frac{r_b(r_e+R_2-r_m)}{r_b+r_e+R_2} \qquad (14a)$$

and $$R_{out}=r_e+\frac{r_b(r_e+R_1-r_m)}{r_b+r_e+R_1} \qquad (15a)$$

assuming $Z_1$ and $Z_2$ to be replaced by $R_1$ and $R_2$.

Figure 7:
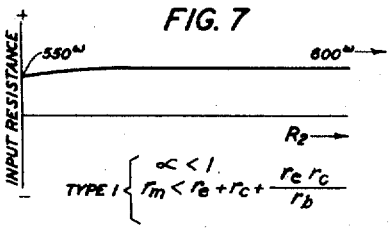
Figs. 7, 9 and 11 are graphs showing the variation of the input impedance of the network of Fig. 3 with load resistance for three representative types of transistor characteristic.
Figure 8:
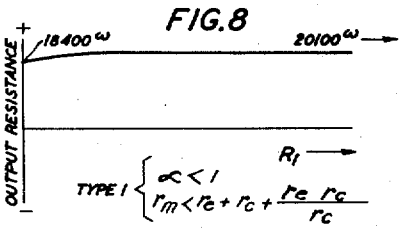
Figs. 8, 10 and 12 are graphs showing the variation of the output impedance of the network of Fig. 3 with source resistance under the same conditions.

In transistors of type 1, $\alpha<1$, so that $r_m<r_c$, and both of these expressions give positive values for all positive values of $R_1$ and $R_2$. The variation of $R_{in}$ and $R_{out}$ with $R_2$ and $R_1$, respectively, is small. The variations of $R_{in}$ and $R_{out}$ are plotted in Figs. 7 and 8 as functions of $R_2$ and $R_1$, respectively, for the type 1 transistor whose parameters were given above. The input resistance, as shown in Fig. 7, varies between 550 and 600 ohms for a variation of $R_2$ between zero and infinity and the output resistance, as shown in Fig. 8, varies between 18,400 and 20,100 ohms for a variation of $R_1$ between zero and infinity.

In transistors of type 2, $\alpha>1$ but $$r_m<r_e+r_c+\frac{r_e r_c}{r_b} \qquad (16)$$

Figure 9:
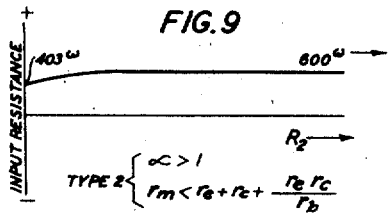
Figure 10:
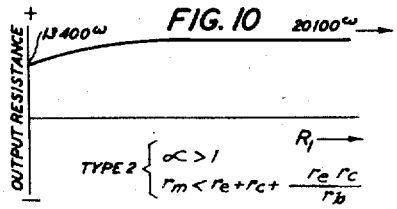

The variations of $R_{in}$ and $R_{out}$ with $R_1$ and $R_2$ as shown in Figs. 9 and 10 for a transistor of this type are somewhat greater, but both are still positive for all positive values of $R_1$ and $R_2$.

Figure 11:
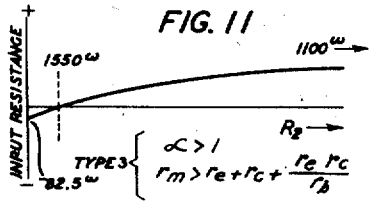
Figure 12:
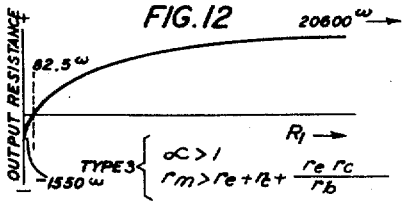

With the type 3 transistor parameters, where $$\alpha>1 \text{ and } r_m>r_e+r_c+\frac{r_e r_c}{r_b} \qquad (17)$$

startling new results are obtained. There are revealed in Figs. 11 and 12, which are plots of input resistance as a function of $R_2$ and of output resistance as a function of $R_1$. It is apparent that both the input resistance and the output resistance pass through zero values, for critical values of $R_2$ and $R_1$, respectively, and are positive for greater values and negative for smaller. Thus, there is furnished a transistor network capable of giving amplification, and which has zero or negative input resistance or zero or negative output resistance. Furthermore, these results are independent of one another, so that they may be obtained separately or together, as desired, within the limitations imposed by stability requirements. It will be evident from inspection of Figs. 11 and 12, that this arrangement is not "short-circuit stable." That is, if both $R_1$ and $R_2$ are zero, the network may break into oscillation because of the negative resistances of the input and output circuits. If $R_1=0$, $R_2$ must be at least 1550 ohms, or if $R_2=0$, $R_1$ must be at least 82.5 ohms to obtain a stable arrangement.

The critical value of $R_2$, for which $R_{in}=0$, is given by $$R_2=\frac{r_b(r_m-r_e)}{r_e+r_b}-r_e \qquad (18)$$

Similarly, the output resistance $R_{out}$ is zero for $$R_1=\frac{r_b(r_m-r_e)}{r_e+r_b}-r_e \qquad (19)$$

Transistor networks of the type shown in Fig. 3, in which the input or output resistance has been adjusted in the manner described above to have a zero value, are of use in current measuring instruments. Those in which the resistance has been adjusted to a negative value are of use as negative resistance boosters, and the like. On the other hand, and especially when $\alpha>1$, the invention provides a simple and convenient adjustment of the magnitudes of the input and output impedances of such networks to match positive source and load impedances, respectively.

Figure 13:
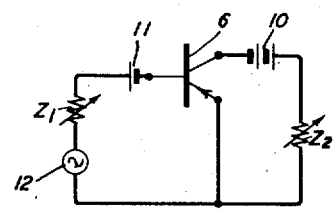
Fig. 13 is a schematic circuit diagram of a transistor amplifier network of the grounded emitter type.
Figure 14:
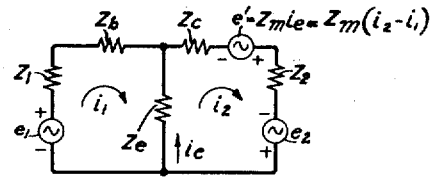
Fig. 14 is the equivalent circuit of Fig. 13.

Fig. 13 shows a transistor connected into a network of the so-called "grounded emitter" type. As shown by the equivalent circuit, Fig. 14, this term means merely that the emitter impedance $Z_e$ is common to the two meshes while the base impedance $Z_b$ and the collector impedance $Z_c$ are individual to the separate meshes. The fictitious electromotive force e′ which is characteristic of the transistor is again given by $$e'=Z_m i_e$$

but the emitter current $i_e$ is now replaced by the difference between the mesh currents $i_1$ and $i_2$. Thus $$i_e=i_2-i_1$$

As before, a test voltage source $e_1$ and an input impedance $Z_1$ are connected to the input terminals while a second test voltage source $e_2$ and a load impedance $Z_2$ are connected to the output terminals. Mesh equation analysis of the circuit of Fig. 14 in the matter outlined above gives $$Z_{in}=Z_b+\frac{Z_e(Z_c+Z_2)}{Z_e+Z_c+Z_2-Z_m} \qquad (20)$$

and $$Z_{out}=Z_c+\frac{(Z_e-Z_m)(Z_1+Z_b)}{Z_1+Z_b+Z_e} \qquad (21)$$

These may also be rewritten for frequency ranges which are not too high, as $$R_{in}=r_b+\frac{r_e(r_c+R_2)}{r_e+r_c+R_2-r_m} \qquad (20a)$$

and $$R_{out}=r_c+\frac{(r_e-r_m)(R_1+r_b)}{R_1+r_b+r_e} \qquad (21a)$$

where $Z_1$ and $Z_2$ are replaced by $R_1$ and $R_2$. These latter expressions are plotted as functions of $R_2$ and $R_1$, respectively.

Figure 15:
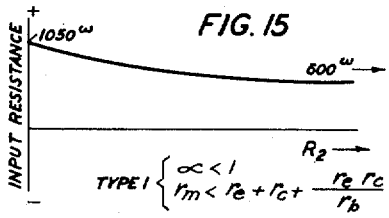
Figs. 15, 17 and 19 are graphs showing the variation of the input impedance of the network of Fig. 13 with load resistance for three representative types of transistor characteristic.
Figure 16:
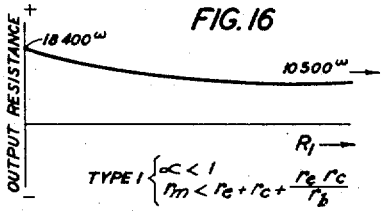
Figs. 16, 18 and 20 are graphs showing the variations of the output impedance of the network of Fig. 13 with source resistance under the same conditions.

(a) In Figs. 15 and 16 for the illustrative parameter values previously chosen for type 1 transistors, with which $\alpha<1$ and $$r_m<r_e+r_c+\frac{r_e r_c}{r_b}$$

Figure 17:
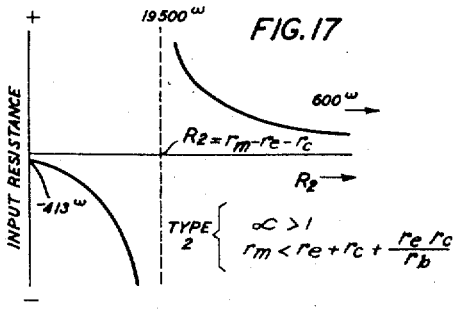
Figure 18:
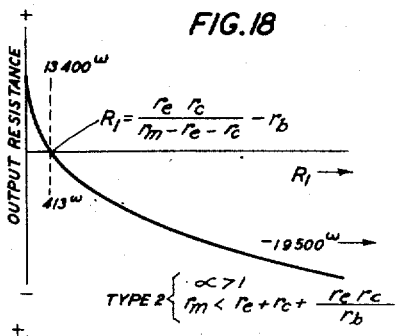

(b) In Figs. 17 and 18 for the illustrative parameter values previously chosen for type 2 transistors with which $\alpha>1$ and $$r_m<r_e+r_c+\frac{r_e r_c}{r_b}$$

Figure 19:
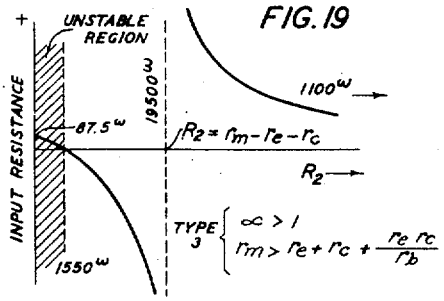
Figure 20:
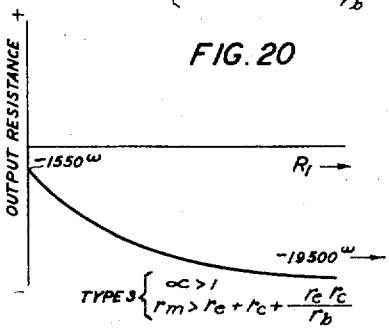

(c) In Figs. 19 and 20 for the illustrative parameter values previously chosen for type 3 transistors with which $\alpha>1$ and $$r_m>r_e+r_c+\frac{r_e r_c}{r_b}$$

With the type 1 transistor characteristic in which $\alpha<1$, the input and output resistances remain positive for all values of $R_2$ and $R_1$, respectively, though their magnitudes are controllable by adjustment of these resistors.

But when $\alpha>1$, startling results occur. Thus, in Figs. 17 and 19, the input resistance becomes infinite for a load resistance given by $$R_2=r_m-r_e-r_c \qquad (22)$$

being positive for greater values and negative for lesser values. In addition, and subject to the condition $$r_m>r_e+r_c+\frac{r_e r_c}{r_b}$$

The value of $R_{in}$ becomes zero when $$R_2=\frac{r_b(r_m-r_e)}{r_b+r_e}-r_c \qquad (23)$$

The proximity, along the $R_2$ axis, of the points for which $R_{in}=0$ and $R_{in}=\infty$ makes it a simple matter to vary $R_2$ between these values in any desired manner, and so adapts the network of Fig. 13, when incorporating a transistor of type 3, to use in modulation systems of the so-called absorption modulation type. Referring to Fig. 18, the output resistance for the network with a type 2 transistor is zero at a value of $R_1$ which, from Equation 21a is given by $$R_1=\frac{r_e r_c}{r_m-r_e-r_c}-r_b \qquad (24)$$

being positive for lesser values and negative for greater. For a type 3 transistor, for which $$r_m>r_e+r_c+\frac{r_e r_c}{r_b}$$

the output impedance is always negative, but is variable over a wide range of adjustment of $R_1$.

The network of Fig. 13, when adjusted in the manner described above, in addition to providing amplification, is useful for matching impedances, as a negative resistance, as a zero impedance device, and in various other connections.

Figure 21:
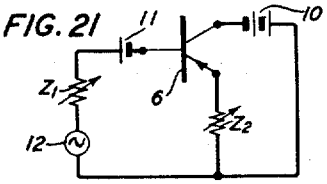
Fig. 21 is a schematic circuit diagram of a transistor amplifier network of the grounded collector type.
Figure 22:
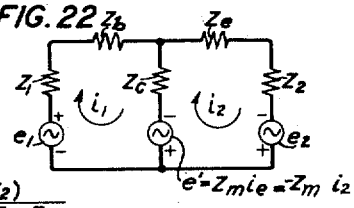
Fig. 22 is the equivalent circuit of Fig. 21.

Fig. 21 shows a transistor connected in a network of the so-called "grounded collector" type. As shown by the equivalent circuit, Fig. 22, this term means merely that the collector impedance $Z_c$ is common to the two meshes while the base impedance $Z_b$ and the emitter impedance $Z_e$ are individual to the separate meshes. The fictitious electromotive force e′ which characterizes the transistor performance is again connected in series with $Z_c$ and is given by $$e'=Z_m i_e$$

but in this case $$i_e=-i_2$$

Test voltage sources $e_1$ and $e_2$ and source and load impedances $Z_1$ and $Z_2$ are connected between the input terminals and between the output terminals, as before. Mesh equation analysis of the circuit of Fig. 20 in the manner outlined above gives $$Z_{in}=Z_b+\frac{Z_c(Z_e+Z_2)}{Z_e+Z_c+Z_2-Z_m} \qquad (25)$$

and $$Z_{out}=Z_e+\frac{(Z_1+Z_b)(Z_c-Z_m)}{Z_c+Z_b+Z_1} \qquad (26)$$

Considering the less general case of purely resistive elements, we have on rewriting:

$$R_{in}=r_b+\frac{r_c(r_e+R_2)}{r_e+r_c+R_2-r_m} \qquad (25a)$$

and $$R_{out}=r_e+\frac{(R_1+r_b)(r_c-r_m)}{r_c+r_b+R_1} \qquad (26a)$$

when $R_1$ and $R_2$ are substituted for $Z_1$ and $Z_2$, respectively. These resistances are plotted, as functions of $R_2$ and $R_1$, respectively.

Figure 23:
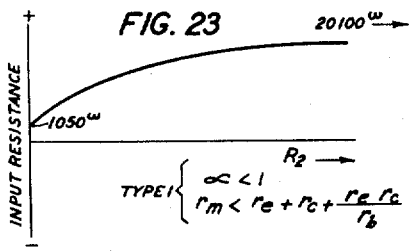
Figs. 23, 25 and 27 are graphs showing the variation of the input impedance of the network of Fig. 21 with load resistance for three representation types of transistor characteristic.
Figure 24:
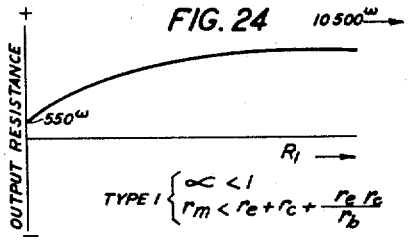
Figs. 24, 26 and 28 are graphs showing the variation of the output impedance of the network of Fig. 21 with source resistance under the same conditions.

(a) In Figs. 23 and 24 for a transistor of type 1, in which $$\begin{cases}\alpha<1\\ r_m<r_e+r_c+\dfrac{r_e r_c}{r_b}\end{cases}$$

Figure 25:
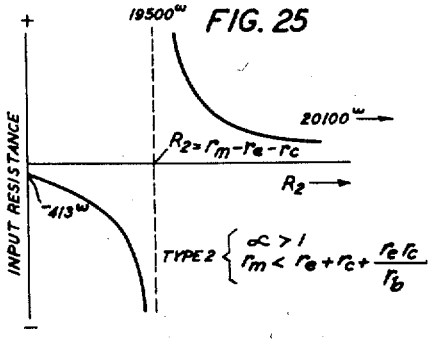
Figure 26:
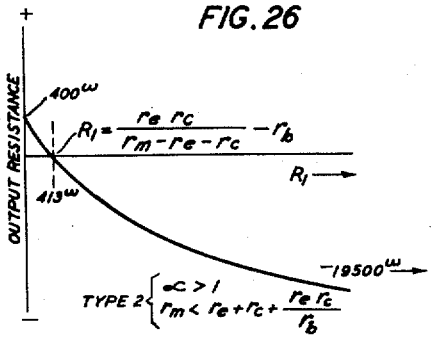

(b) In Figs. 25 and 26 for a transistor of type 2, in which $$\begin{cases}\alpha>1\\ r_m<r_e+r_c+\dfrac{r_e r_c}{r_b}\end{cases}$$

Figure 27:
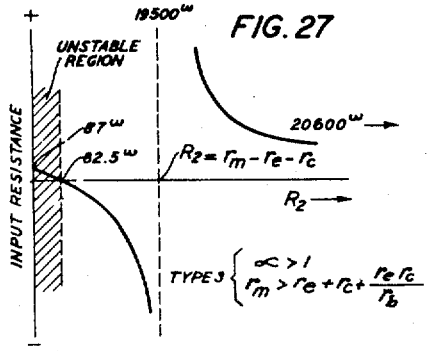
Figure 28:
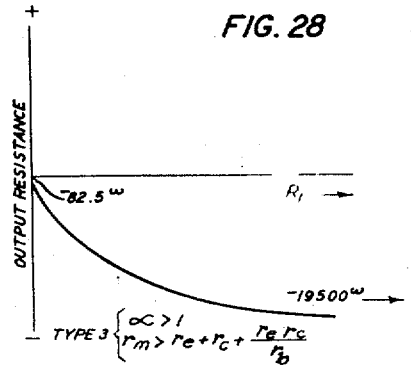

(c) In Figs. 27 and 28 for a transistor of type 3, in which $$\begin{cases}\alpha>1\\ r_m>r_e+r_c+\frac{r_e r_c}{r_b}\end{cases}$$

It will be noted that the curves of these figures are the same in many particulars as those of Figs. 15 to 20. Thus, the conditions under which $R_{in}$ reaches infinity in Figs. 25 and 27 are identical with those for which the same result arises in Figs. 17 and 19. Again, the conditions for which $R_{out}$ reaches zero in Fig. 26 are the same as those for which the like result occurs in Fig. 18. The particular values of $R_2$ and $R_1$ which give these results are For $R_{in}=\infty$ $$R_2=r_m-r_e-r_c \tag{27}$$

For $R_{out}=0$ $$R_1=\frac{r_e r_c}{r_m-r_c-r_e}-r_b \tag{28}$$

which is identical with the value of $R_1$ for which $R_{out}$ reaches zero in Fig. 18. The value of $R_2$ for which $R_{in}$ has a zero value, in the case of transistors of type 3, is $$R_2=\frac{r_b(r_m-r_e)}{r_b+r_c}-r_e$$

The network of Fig. 21, when adjusted in the manner described above, can be put to use in any of the various connections above referred to in connection with the other figures.

It will be observed that in Figs. 19 and 27, those regions are indicated as being unstable in which the input impedance is positive for values of the load resistance less than that for which it is negative. To understand the nature and explanation of this instability, consider first the plot of the output impedance as a function of source resistance, Fig. 20. This is a negative resistance for any and all values of source resistance between zero and infinity. This negative resistance is of the so-called "series-type," i. e., the network of which it forms a part will be stable only if a positive resistance is connected in series with it, of which the value is greater than that of the negative resistance. By way of example, assume that the source resistance $R_1$ is zero. From Fig. 20, the output impedance then appears as a negative resistance of −1550 ohms. If a load resistance $R_2$ equal to or greater than 1550 ohms is connected to the output terminals of the transistor network, the network as a whole will be stable. If, however, the value of the external load resistance is less than 1550 ohms, the net resistance in the output circuit will be negative and the network will oscillate or sing. Addition of resistance $R_1$ in the input circuit does not cure the situation but only makes things worse, because, as shown by Fig. 20 any increase of source resistance above zero causes a larger negative value of the output impedance of the network, which therefore requires a correspondingly larger value of load resistance to prevent oscillation.

Thus, if the external load resistance has a positive value, which is less in magnitude than the negative output resistance for zero input resistance, the system as a whole will be inherently unstable, even though its input impedance appears to be positive, as indicated in those parts of Fig. 19 which lie in the shaded area.

The explanation of instability in the case of Fig. 27 is the same as that of Fig. 19 except for numerical values.

With the networks described above, it is possible to design a single amplifier stage whose input impedance or output impedance is respectively matched to the impedance of a source or of a load as long as these are not too high or too low. A further problem arises when one of them is infinite or zero. Take, for example, the common situation in which it is desired that the input impedance of an amplifier be substantially infinite while its output impedance has a specified value between zero and infinity. This problem may be illustrated in connection with Fig. 21. The input impedance may be made infinite by so choosing $R_2$ that the denominator of (25) vanishes; but it may happen that the load with which the network is to work has a resistance of widely different value.

This problem is solved, in accordance with the invention in one of its aspects, by the use of an additional variable parameter in the form of a padding resistor.

Figure 29:
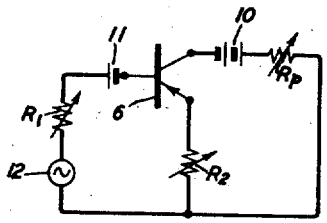
Fig. 29 is a schematic circuit diagram showing a modification of the transistor amplifier network of Fig. 21.
Figure 30:
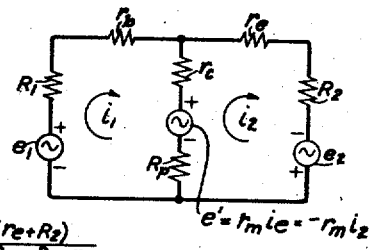
Fig. 30 is the equivalent circuit diagram of the network of Fig. 29.

It may be readily appreciated that the addition of a resistance in series with emitter, base or collector is equivalent in effect to increasing the magnitude of $r_e$, $r_b$ or $r_c$ respectively, in the foregoing equations for input and output resistance. Fig. 29 illustrates the principle as applied to the grounded collector network of Fig. 21, and Fig. 30 shows the equivalent circuit. It differs from Fig. 22 by the addition of the padding resistor $R_p$ in series with the collector. Solution of the network equations in the manner heretofore described but for resistances directly, instead of for the more general impedances yields, for the input resistance:

$$R_{in}=r_b+\frac{(r_c+R_p)(r_e+R_2)}{r_e+r_c+R_p+R_2-r_m} \tag{29}$$

and for the output resistance:

$$R_{out}=r_c+\frac{(R_1+r_b)(R_p+r_e-r_m)}{r_b+r_e+R_1+R_p} \tag{30}$$

It is evident from these equations that the load resistance $R_2$ may be independently chosen, and that it is still possible to make the input impedance infinite by adjusting the sum of $R_2$ and the padding resistor $R_p$, while using a value of the load resistance $R_2$ which may be dictated by other considerations.

Figure 31:
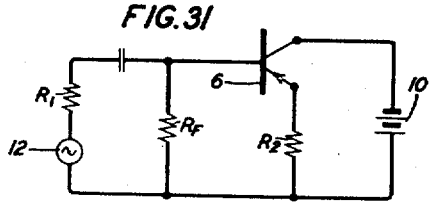
Figs. 31, 33 and 35 are schematic diagrams showing further modifications of the transistor amplifier network of Fig. 21.
Figure 32:
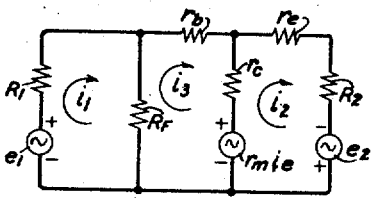
Figs. 32, 34 and 36 are the equivalent circuits of the networks of Figs. 31, 33 and 35, respectively.

With the network of Fig. 29, a fraction of the power output of the transistor is absorbed in the padding resistor and is therefore not available to the load. Under some circumstances this may be objectionable; and to reduce this power loss without sacrificing the impedance matching advantages of Fig. 29, resort may be had to still another transistor network which is illustrated in Fig. 31, while its equivalent circuit is shown in Fig. 32. This network is the same as that of Fig. 21 except for the addition of a feedback resistor $R_F$ in shunt with the input terminals of the transistor. This addition results in the addition of a third mesh to the network, designated is in Fig. 32. Solution of the mesh equation yields, for the input resistance:

$$R_{in}=\frac{r_b R_F(R_2+r_e+r_c-r_m)+R_F r_c(R_2+r_e)}{(r_b+R_F)(R_2+r_e+r_c-r_m)+r_c(R_2+r_e)} \tag{31}$$

Comparison of Equation 31 with Equation 25a shows that the former may be obtained by multiplying Equation 25a by $R_F$ and dividing this product by the sum of Equation 25a and $R_F$. In other words, Equation 31a is the mathematical statement of the fact that in Figs. 31 and 32 the input resistance of the network of Fig. 29 as given by Equation 25a has been reduced by connecting the resistor $R_F$ in shunt with the input terminals of Fig. 29 and for the output resistance:

$$R_{out}=r_e+\frac{\left(\frac{R_1R_F}{R_1+R_F}+r_b\right)(r_c-r_m)}{r_c+r_b+\frac{R_1R_F}{R_1+R_F}} \quad (31a)$$

From Equation 31 it is evident that, within the restriction $$r_m>(R_2+r_e+r_c) \quad (32)$$

the input impedance may take on values which are positive, negative, zero, or infinite, as required, in dependence on the values of $R_2$ and $R_F$. This evidently gives greater freedom in the selection of the load resistance, as compared with Equation 25 which applies to the network of Fig. 21, in the same manner that the use of the padding resistor in Fig. 29 provides such freedom. At the same time, all of the power output of the transistor is furnished to the load, at the expense of some power absorbed in $R_F$. The latter power is driven from the source rather than from transistor. This difference is of advantage under some circumstances.

In the vacuum tube amplifier art, it is known that certain advantages accrue from the use of negative or inverse feedback. The conventional cathode follower vacuum tube circuit with large, unbypassed cathode resistor embodies the inverse feedback principle, and, as is well known, the input impedance of such a circuit, "looking" into its grid and load resistor terminals is greatly increased, as compared with that of a "grounded cathode" circuit employing the same tube. The networks of Figs. 21, 29 and 31 may be looked upon as embodying the same negative feedback principle but they differ from the most nearly analogous vacuum tube circuits in that the input impedance may take on the widely varying values discussed above. The effect of the resistor $R_F$ in Fig. 31 may be looked upon as further increasing the inverse feedback of Fig. 21 by providing a second path, in addition to that through the source resistance $R_1$, through which the feedback current can flow, and so furnishing a greater current to the base electrode for a given voltage drop across the load resistor, or a greater voltage feedback for a given emitter current, depending on one's point of view. The mode of operation of the network of Fig. 31 can also be looked upon as follows: Elimination of the padding resistor $R_p$ of Fig. 29 effectively reduces the total resistance in the output circuit of the transistor below the value at which the input impedance becomes infinite. As a result, the input impedance of the transistor, without the feedback resistor $R_F$, is negative. Insertion of the feedback resistor $R_F$ of the proper magnitude now places a positive resistance in shunt with the negative input resistance of the transistor network of just such a magnitude as to bring the input impedance of the network as a whole back to infinity.

Figure 33:
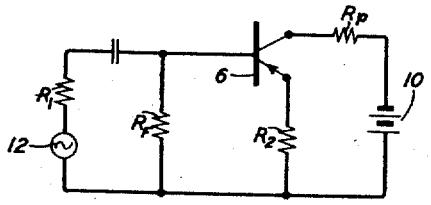
Figure 34:
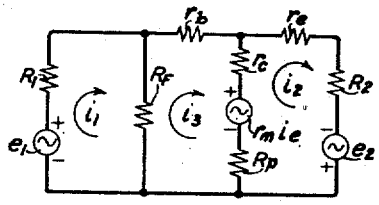

Still further flexibility results when the padding resistor $R_p$ of Fig. 29 and the feedback resistor $R_F$ of Fig. 31 are embodied in the same transistor network. Such a network is shown in Fig. 33 and its equivalent circuit is shown in Fig. 34. The expressions for the input and output impedances are like those for Fig. 31 but for the fact that the collector resistance $r_c$ is to be replaced, wherever it occurs, by $$r_c+R_p$$

and that the condition (32) is replaced by $$r_m>(R_2+r_e+r_c+R_p) \quad (33)$$

Figure 35:
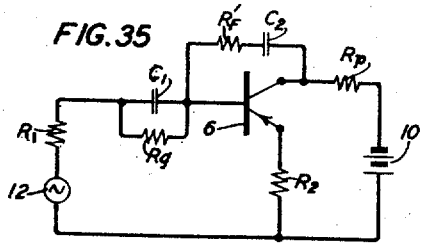
Figure 36:
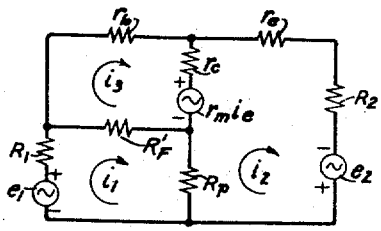

Instead of merely increasing the inverse feedback due to $R_2$ by the use of a shunting resistor as in Fig. 33, an additional negative feedback current may be drawn from the collector and fed to the base electrode by way of a feedback resistor $R_F'$, as in Fig. 35. Here $C_1$ and $C_2$ are merely blocking condensers of negligible impedance at signal frequencies and are omitted from the equivalent circuit Fig. 36. The resistor $R_F'$ therefore carries a current to the base electrode, which current is in phase with the collector voltage. In the absence of the feedback path, there is a phase reversal between the voltage on the base electrode and the voltage on the collector. Therefore the feedback furnished by way of the resistor $R_F'$ is negative or degenerative, and its use carries with it all of the advantages which are now well known in connection with negative feedback such as the stabilization of amplifier gain, reduction of noise, etc. Solution of the mesh equations of Fig. 36 shows that the input impedance becomes infinite subject to the same condition (33) and for slightly different values of $R_2$, $R_F$ and $R_p$. The differences, though slight from the analytical standpoint, may become critical in particular circumstances.

Figure 37:
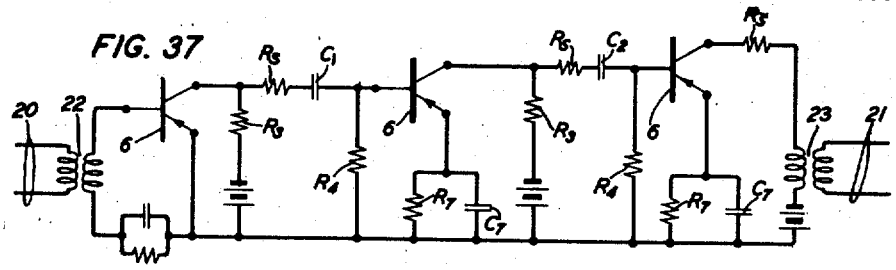
Fig. 37 is a schematic circuit diagram of an amplifier comprising a plurality of similar transistor amplifier stages in tandem.

The various networks of the invention may be coupled together in various ways. Fig. 37 shows a three-stage amplifier coupling an incoming line 20 to an outgoing line 21. Characteristic impedances of these lines may be alike. The operation of tandem stages without using interstage transformers presents a problem to the designer of transistor networks who has not the benefit of the present invention. The input resistance of the first stage may be matched to the resistance of the source, that is of the incoming line 20, by use of the appropriate transformation ratio in an input transformer 22. In each stage the resistances $R_3$ and $R_4$ may be assumed to be very high resistances so that they do not appreciably shunt the output of the stage ahead of it or the input of the following stage. The load on the first stage is therefore the series combination of an interstage resistor $R_S$ and the input impedance of the second stage. Since $R_S$ appears both in the input impedance and the output impedance, it may be adjusted to serve both purposes.

The application of the foregoing principles to this particular problem is illustrated for a typical transistor of type 2, in which $r_b$=100 ohms
$r_e$=500 ohms
$r_c$=20,000 ohms
$r_m$=40,000 ohms $$\alpha=\frac{40,100}{20,100}\doteq 2$$

The output load on the first stage is the sum of $R_S$ and the input impedance of the following stage. Equation 20a is a general expression for the input resistance of a grounded emitter transistor amplifier stage as a function of its load resistance. In this expression, replacing $R_2$ by $R_S+R_{in}$ gives $$R_{in}=r_b+\frac{r_e(r_e+R_S+R_{in})}{r_e+r_c+R_S+R_{in}-r_m}$$

Insertion of the numerical values listed above in this expression gives $$R_{in}=100+\frac{500(20,000+R_S+R_{in})}{500+20,000+R_S+R_{in}-40,000} \text{ ohms}$$

Equation 21a is likewise a general expression for the output impedance of a grounded emitter stage as a function of its input terminating resistance $R_1$. Introducing the condition that the impedance of each stage shall be matched, at its input terminals, to its input termination, i. e., $R_1=R_{in}$, gives $$R_{out}=r_c+\frac{(r_e-r_m)(R_{in}+r_b)}{R_{in}+r_b+r_e}$$

Inserting the foregoing numerical values, with $R_{in}$ still undetermined, gives $$R_{out}=20,000+\frac{(500-40,000)(R_{in}+100)}{R_{in}+100+500}$$

The conditions of the problem are that the input terminating resistance of each stage shall be equal to the series combination of $R_S$ with the output impedance of the prior stage, or $$R_{in}=R_S+R_{out}$$

Simultaneous solution of these three equations gives, for the assumed numerical values:

$R_{in}$=4,500 ohms
$R_{out}$=−15,600 ohms
$R_S$=20,100 ohms

Since the stages are all to be alike, this result holds for any stage, so that a multistage amplifier of as many stages as may be desired can be built up, in which each input impedance is 4,500 ohms, and in which, furthermore, the effective output impedance of each stage ($R_{out}+R_S$) is likewise 4,500 ohms. Transformers 22, 23, or other impedance matching networks may now be connected at the input and output terminals of the amplifier as a whole to effect a match to the incoming and outgoing lines 20, 21. Each stage of the amplifier, using the assumed numerical values, has a power gain of 18 decibels, which would be impossible to secure in a multistage amplifier in which interstage impedance matching was obtained merely by the use of padding resistors in series with the input circuits and potentiometers in the output circuits.

It will be noted that, in Fig. 37, the emitter bias battery 11 of the earlier figures has been omitted. It is replaced, in the first stage, by a self-bias circuit of the type which forms the subject-matter of an application of R. C. Mathes and H. L. Barney, Serial No. 22,854, filed April 23, 1948 and issued August 8, 1950, as Patent 2,517,960 and in the second and third stages by a different self-bias arrangement, which forms the subject-matter of an application of H. L. Barney, Serial No. 123,507, filed October 25, 1949. The shunt resistors $R_4$ are required to be of fairly low value from the standpoint of self-bias alone while, in order to reduce their shunting effect across the input terminals of the amplifier stage, they are required to be of high value. These incompatible requirements can be resolved by the addition of a resistor-condenser combination $R_7$, $C_7$ connected between the emitter electrode and ground. The resistor $R_7$ is by-passed for signal frequency purposes by the condenser $C_7$ but it carries a potential drop which is nearly equal in magnitude to that across the shunt resistor $R_4$. By this means self-bias of the base electrode with respect to the emitter in the required magnitude of a fraction of a volt is secured for the transistors of the second and third stages without resort to an interstage transformer.

Figure 38:
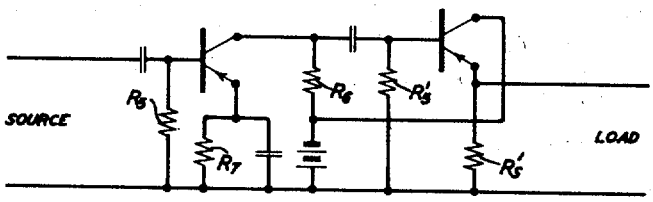
Fig. 38 is a schematic diagram showing a two-stage amplifier of which the individual stages are unlike.

Under some circumstances the restrictions placed on the amplifier of Fig. 37 may be considered too severe. For most purposes a sufficient requirement is that (a) the input impedance of the first stage of an amplifier match the source impedance; (b) the output impedance of each stage match the input impedance of the following stage; and (c) the output impedance of the last stage match the impedance of the load. Requirements of this type may be met comparatively simply in a two-stage amplifier network with a circuit such as that of Fig. 38, in which transistors having type 1 characteristics are used. Here, assuming the values of resistors $R_5$ and $R_6$, which merely supply operating potentials to the electrodes, to be high, the load on the first or grounded-emitter stage consists merely of the input impedance of the second stage. Thus condition (a) may be met by selecting the first stage output termination in accordance with Equation 20a; condition (b) is met by selecting the second stage output termination in accordance with Equation 25a at such a value that its input impedance is equal to the output impedance of the first stage as just determined, and, lastly, condition (c) is met by constructing the resulting output termination of two parts, the load itself and an adjustment resistor $R_S'$. The latter is shown with the load. Circumstances may require that it be connected in series with the load instead.

Figure 39:
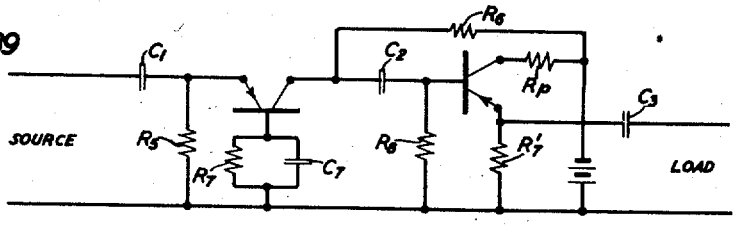
Figs. 39, 40 and 41 are schematic circuit diagrams of modifications of the amplifier of Fig. 38.

Fig. 39 shows a two-stage amplifier of which the first stage is of the grounded base type (Fig. 3), while the second stage is of the grounded collector type with padding resistor $R_P$ (Fig. 29). Transistors having type 1, 2 or 3 characteristics may be used in either stage of this amplifier. The resistors $R_5$, $R_6$ and $R_8$ of which $R_5$ and $R_8$ are self-bias resistors, merely serve to apply correct operating potentials to the electrodes. With the compensating resistors $R_7$ and $R_7'$ in the circuit, $R_5$ and $R_8$ may be of such large value as not seriously to shunt the source or the first stage output. By reason of the direct interstage coupling ($C_1$ and $C_2$ are merely blocking condensers) the output terminating impedance seen by the first stage is the input impedance of the second. In the manner explained above, but using the impedance expressions appropriate to the networks, namely, Equations 14 and 15 for the first stage and 29 and 30 for the second, and finally selecting the adjustment resistor $R_7'$ so that when it is connected in parallel with the load as shown, or in series with the load, this combination of resistor $R_7'$ and the load presents the necessary impedance to the output terminals of the second stage.

Figure 40:
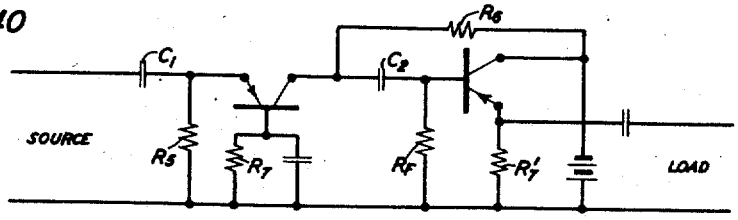
Figure 41:
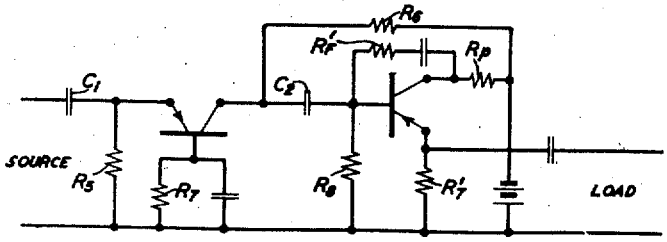

In place of the padding resistor $R_P$ of Fig. 39, the feedback resistor $R_F$ of Figs. 33 and 35 may be employed, if desired, to give flexibility to the choices of the other resistors. Fig. 40 shows a two-stage amplifier in which the second stage is like Fig. 31, and Fig. 41 shows one in which the second stage is like that of Fig. 35. The impedance matching principles, and the manner in which they are to be put in practice, are as explained above, due regard being had to the expressions governing the input and output impedances of the transistor network employed in each case.

Reference is made to two divisions of the present application, both of which were filed on November 15, 1949, namely, application Serial No. 127,439, now Patent 2,550,518, issued April 24, 1951, and application Serial No. 127,440, now Patent 2,541,322, issued February 13, 1951. Reference is also made to a related original application Serial No. 58,685, filed November 6, 1948, *now Patent 2,585,078, issued February 12, 1952.*

What is claimed is:

1. An amplifier network having an adjustable input impedance which comprises a transistor comprising a semiconductive body, a base electrode, an emitter electrode and a collector electrode cooperatively associated therewith, said transistor being characterized by a ratio of short-circuit collector current increments to emitter current increments which, under proper conditions of electrode bias is greater than unity, means including an energy source for establishing said proper bias conditions, an input circuit interconnecting said base electrode and said emitter electrode, an output circuit interconnecting said emitter electrode and said collector electrode, and a load connected in said output circuit, the effective resistance $R_2$ of said load being proportioned in accordance with the formula $$R_{in}=r_b+\frac{r_e(r_c+R_2)}{r_e+r_c+R_2-r_m}$$

where $r_e$=emitter resistance of the transistor
$r_b$=base resistance of the transistor
$r_c$=collector resistance of the transistor
$r_m$=mutual resistance of the transistor
$R_{in}$=input resistance of the transistor network to cause the input impedance of the network to have a desired value.

2. An amplifier network having an adjustable output impedance which comprises a transistor comprising a semiconductive body, a base electrode, an emitter electrode and a collector electrode cooperatively associated therewith, said transistor being characterized by a ratio of short-circuit collector current increments to emitter current increments which, under proper conditions of electrode bias is greater than unity, means including an energy source for establishing said proper bias conditions, an input circuit interconnecting said base electrode and said emitter electrode, an output circuit interconnecting said emitter electrode and said collector electrode, and an input termination connected in said input circuit, the effective resistance $R_1$ of said termination being proportioned in accordance with the formula $$R_{out}=r_c+\frac{(r_e-r_m)(R_1+r_b)}{R_1+r_b+r_e}$$

where $r_e$=emitter resistance of the transistor
$r_b$=base resistance of the transistor
$r_c$=collector resistance of the transistor
$r_m$=mutual resistance of the transistor
$R_{out}$=output resistance of the transistor network to cause the output impedance of the network to have a desired value.

[3. An amplifier network having a substantially zero input impedance which comprises a transistor comprising a semiconductive body, a base electrode, an emitter electrode and a collector electrode cooperatively associated therewith, said transistor being characterized by a ratio of short-circuit collector current increments to emitter current increments which, under proper conditions of electrode bias is greater than unity, means including an energy source for establishing said proper bias conditions, an input circuit interconnecting said base electrode and said emitter electrode, an output circuit interconnecting one of said two last-named electrodes with said collector electrode, and a load resistor $R_2$ connected in said output circuit, said resistor having a value given substantially by the formula $$R_2=\frac{r_b(r_m-r_e)}{r_e+r_b}-r_c$$

where $r_e$=emitter resistance of the transistor
$r_b$=base resistance of the transistor
$r_c$=collector resistance of the transistor
$r_m$=mutual resistance of the transistor.]

[4. An amplifier having a substantially zero output impedance which comprises a transistor comprising a semiconductive body, a base electrode, an emitter electrode and a collector electrode cooperatively associated therewith, said transistor being characterized by a ratio of short-circuit collector current increments to emitter current increments which, under conditions of electrode bias is greater than unity, means including an energy source for establishing said proper bias conditions, an output circuit interconnecting said emitter electrode with said collector electrode, an input circuit interconnecting one of said last-named electrodes with said base electrode, and a terminating resistor $R_1$ connected in said input circuit, said resistor having a value substantially by the formula $$R_1=\frac{r_e r_c}{r_m-r_e-r_c}-r_b$$

where $r_e$=emitter resistance of the transistor
$r_b$=base resistance of the transistor
$r_c$=collector resistance of the transistor
$r_m$=mutual resistance of the transistor.]

[5. An amplifier having a substantially infinite input impedance which comprises a transistor comprising a semiconductive body, a base electrode, an emitter electrode and a collector electrode cooperatively associated therewith, said transistor being characterized by a ratio of short-circuit collector current increments to emitter current increments which, under proper conditions of electrode bias is greater than unity, means including an energy source for establishing said proper bias conditions, an output circuit interconnecting said emitter electrode and said collector electrode, an input circuit interconnecting one of said last-named electrodes with said base electrode, and a load resistor $R_2$ connected in said output circuit, said resistor having a value given substantially by the formula $$R_2=r_m-r_e-r_c$$

where $r_e$=emitter resistance of the transistor
$r_b$=base resistance of the transistor
$r_c$=collector resistance of the transistor
$r_m$=mutual resistance of the transistor.]

6. An amplifier adapted to be connected in cascade between a low impedance source and a low impedance load, which comprises a first transistor amplifier network of the grounded emitter configuration, having output terminals, an intrinsically low input impedance and an intrinsically high output impedance, a second transistor amplifier network of the grounded collector configuration having input terminals connected to the output terminals of the first network, an output circuit, a resistor, said resistor and said low impedance load being connected in said ouput circuit, said resistor being proportioned, in dependence on the impedance of said load, to make the input impedance of the grounded collector stage equal to the output impedance of the grounded-emitter stage.

7. A multistage amplifier comprising a plurality of like transistor amplifier networks coupled together in cascade, each of said networks having input terminals and output terminals, a plurality of resistors, each connected in series between the output terminals of the preceding network and the input terminals of the following network, and each having a resistance value $R_s$ which satisfies the relations $$R_{in}=r_b+\frac{r_e(r_c+R_s+R_{in})}{r_e+r_c+R_s+R_{in}-r_m}$$

$$R_{out}=r_c+\frac{(r_e-r_m)(R_{in}+r_b)}{R_{in}+r_b+r_e}$$

where $$R_{in}=R_s+R_{out}$$

$r_e$=emitter resistance of the transistor
$r_b$=base resistance of the transistor
$r_c$=collector resistance of the transistor
$r_m$=mutual resistance of the transistor.
$R_{in}$=input resistance of the transistor network
$R_{out}$=output resistance of the transistor network.

8. An amplifier of two stages adapted to be connected between a low impedance source and a low impedance load, the first stage comprising a transistor amplifier network of the grounded-emitter configuration having input terminals, output terminals, an intrinsically low but controllable input impedance and an intrinsically high but controllable output impedance, the second stage comprising a transistor network of the grounded-collector configuration having input terminals, output terminals, an intrinsically high but controllable input impedance and an intrinsically low but controllable output impedance, the input terminals of the second stage being directly connected, for signal frequencies, to the output terminals of the first stage, the input impedance of the second stage thus constituting the output termination of the first stage, a resistor, said resistor and said load being connected to the output terminals of the second stage, said resistor and said load, taken together, being so proportioned in relation to the transistor parameters as to make the input impedance of the second stage, and thus the output termination of the first stage, match the output impedance of the first stage and of such a value as to make the input impedance of the first stage match the impedance of the source, said resistor being so proportioned in relation to said load as to make said resistor and load, taken together, match the output impedance of the second stage.

HAROLD L. BARNEY.

REFERENCES CITED

The following references are of record in the file of this patent:

UNITED STATES PATENTS

| Number | Name | Date |
|---|---|---|
| 1,778,085 | Nyquist | Oct. 14, 1930 |
| 1,877,140 | Lilienfeld | Sept. 13, 1932 |
| 1,949,383 | Weber | Feb. 27, 1934 |
| 2,476,323 | Rack | July 19, 1949 |
| 2,517,960 | Barney et al. | Aug. 8, 1950 |